United States Patent [19]

Kampf et al.

[11] 4,381,377
[45] Apr. 26, 1983

[54] HOMO- OR COPOLYMERS OF 1,3-DIENES CARRYING REACTIVE SILYL GROUPS, THEIR PREPARATION AND USE

[75] Inventors: Wolfgang Kampf, Haltern; Roland Streck; Horst-guenter Haag, both of Marl, all of Fed. Rep. of Germany

[73] Assignee: Chemische Werke Huels, AG, Marl, Fed. Rep. of Germany

[21] Appl. No.: 230,483

[22] Filed: Feb. 2, 1981

[30] Foreign Application Priority Data

Feb. 2, 1980 [DE] Fed. Rep. of Germany ....... 3003893

[51] Int. Cl.$^3$ ........................... C07F 7/10; C07F 7/18; C07F 7/04
[52] U.S. Cl. .................................... 525/375; 556/482; 556/465; 556/496; 556/486; 556/422; 556/442; 556/419; 556/489
[58] Field of Search ............... 556/482, 465, 446, 486, 556/442, 422, 419, 489; 525/375

[56] References Cited

U.S. PATENT DOCUMENTS

| | | |
|---|---|---|
| 2,475,122 | 7/1949 | Barry et al. .................. 260/85.1 |
| 2,557,778 | 6/1951 | Barry ........................... 154/128 |
| 2,952,576 | 9/1960 | Wheelock et al. ............ 154/46 |
| 3,244,664 | 4/1966 | Zelinski et al. ............... 260/41.5 |
| 3,440,302 | 4/1969 | Spaier et al. ................. 260/825 |
| 3,470,226 | 9/1969 | Plumb et al. ................. 260/448.8 |
| 3,655,633 | 4/1972 | Saam ........................... 260/79 |
| 3,719,650 | 3/1973 | Joy .............................. 260/89.5 A |
| 3,726,943 | 4/1973 | Joy .............................. 260/37 SB |
| 3,746,611 | 7/1973 | Joy .............................. 161/206 |
| 3,759,869 | 9/1973 | Skeirt et al. ................. 260/41.5 R |
| 3,772,349 | 11/1973 | Joy ............................ 260/448.2 B |
| 3,772,353 | 11/1973 | Joy ............................ 260/448.2 N |
| 3,857,825 | 12/1972 | Streck et al. ................ 260/4 R |
| 3,881,536 | 6/1975 | Doran et al. ................. 260/42.32 |
| 3,920,714 | 11/1975 | Streck .......................... 260/4 R |
| 3,920,715 | 11/1975 | Streck et al. ................ 260/4 R |
| 3,929,850 | 12/1975 | Streck et al. ................ 260/4 R |
| 4,183,844 | 1/1980 | Streck et al. ................ 260/42.15 |
| 4,268,682 | 5/1981 | Oswald et al. .............. 556/482 X |

FOREIGN PATENT DOCUMENTS

| | | |
|---|---|---|
| 1620934 | 7/1970 | Fed. Rep. of Germany . |
| 1720527 | 7/1971 | Fed. Rep. of Germany . |
| 2142596 | 3/1972 | Fed. Rep. of Germany . |
| 2152275 | 4/1972 | Fed. Rep. of Germany . |
| 2152286 | 4/1972 | Fed. Rep. of Germany . |
| 2157405 | 5/1973 | Fed. Rep. of Germany . |
| 2343108 | 3/1974 | Fed. Rep. of Germany . |
| 2314543 | 10/1974 | Fed. Rep. of Germany . |
| 2333566 | 1/1975 | Fed. Rep. of Germany . |
| 2333567 | 1/1975 | Fed. Rep. of Germany . |
| 2635601 | 2/1978 | Fed. Rep. of Germany . |

*Primary Examiner*—Paul F. Shaver
*Attorney, Agent, or Firm*—Millen & White

[57] ABSTRACT

A homo- or copolymer of a 1,3-diene bound to reactive silyl groups, whereby it contains 0.4–12% by weight of bound silicon, is prepared by reacting, at a temperature of 190°–300° C., a 1,3-diene homo- or copolymer, with more than 1% of its aliphatic double bonds in conjugation and having a molecular weight ($\overline{M}n$) of 400–6,000, with a silane of the formula

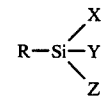

wherein
  R is an unsaturated aliphatic hydrocarbon radical of 2–20 carbon atoms,
  X is halogen, $C_{1-6}$ alkoxy, $C_{1-6}$ alkoxyalkoxy, $C_{6-12}$ aryloxy, $C_{1-8}$ alkanoyloxy, $C_{1-6}$ ketoximato or $C_{1-10}$ hydrocarbylamido, and
  Y and Z are independently one of the X groups, hydrogen, alkyl of 1–8 carbon atoms, cycloalkyl of 5–12 carbon atoms, or optionally substituted phenyl.

10 Claims, No Drawings

HOMO- OR COPOLYMERS OF 1,3-DIENES CARRYING REACTIVE SILYL GROUPS, THEIR PREPARATION AND USE

BACKGROUND OF THE INVENTION

The present invention relates to homo- or copolymers of 1,3-dienes carrying reactive silyl groups, to a process for their production, and their use as adhesion promoters in the preparation of mixtures of polymers, mineral fillers and, optionally, other additives.

It is known to use carbon blacks of various specifications as components of elastomer mixtures. It is furthermore known that one of the purposes of the addition of carbon black is to make resultant vulcanizates less expensive but more importantly to raise the overall level of the useful properties. Among these, most important are tear strength, modules, hardness, tear propagation resistance, and abrasion resistance. Therefore, carbon black is classified as a so-called active or reinforcing filler.

However, for various reasons, the use of carbon black in elastomer mixtures is limited. On the one hand, it is only possible to prepare black mixtures with it; in any event, no colored or white mixtures. On the other hand, high-quality carbon blacks have become so expensive as compared with the cheap mineral fillers, such as silicic acid ($SiO_2$), kaolin, aluminum hydroxide, and glass, that increasing efforts have been made to replace carbon blacks by the light-colored fillers, such as those indicated above. This substitution also reduces the proportion of components based on petroleum, which is subject to supply crises. Moreover, the use of highly active silicic acids is of great advantage for optimizing specific properties, e.g. notch toughness.

Such light-colored mineral fillers have been utilized heretofore, but primarily form the point of view of merely rendering the product less expensive. Initially, this meant considerable losses in properties valuable from the viewpoint of the technology of particular end uses, such as, for example, heat degradation, elasticity, and compression set. Similar problems also exist in filling and/or reinforcing other polymeric materials with mineral fillers, for example polyolefins or unsaturated polyester resins.

It is known that these disadvantages can be eliminated, at least in part, by the use of so-called adhesion promoters. In general, there are materials having a certain affinity to the polymer as well as the filler, expressed preferably in the capability of entering into a chemical reaction with the two substrates.

The organofunctional silanes have become especially well known as adhesive promoters. They have the general formula $R-SiX_3$ wherein X in most cases is alkoxy and less frequently halogen, and the organic residue R is alkyl or aryl substituted by a functional group. These compounds do yield satisfactory results with respect to the properties of the resultant polymer-filler combinations, but they have several disadvantages when used. Thus, in vulcanizable elastomer-filler mixtures various silanes are each suitable optimally only for a specific type of crosslinking technique. Also, unpleasant odors are encountered, for example, when using the mercaptosilanes. Moreover, there is a tendency toward premature vulcanization of the mixtures combined with such compounds (scorching). Moreover, organofunctional silanes, as compared to the other components of the elastomer mixture, are extraordinarily expensive and, in general, exhibit a toxicity by inhalation and skin contact which cannot be neglected.

Furthermore, a great number of attempts has been made to synthesize such adhesion promoters having similar effects and on a polymeric basis. Thus, it has been known, for example, that natural rubber and styrene-butadiene elastomer (SBR) can be hydrosilylated (reacted with hydrosilane) by heating with trichlorosilane to about 300° (U.S. Pat. No. 2,475,122) and that such reaction products adhere well to glass plates (U.S. Pat. No. 2,557,778).

The photochemically based hydrosilylation of a liquid polybutadiene obtained by anionic polymerization is described in U.S. Pat. No. 2,952,576, relating to glass fibers coated with this material for the reinforcement of unsaturated polyester resins. The microstructure of the liquid polybutadiene employed is not mentioned; however, from the data on its manufacture by means of a sodium suspension, in comparison with literature disclosures, it can be concluded that it contains about 60–70% vinyl groups, as well as 30–20% trans-vinylene groups, and only about 10% cis-vinylene groups.

The catalysis of hydrosilylation of polybutadienes by platinum compounds is described in DOS's [German Unexamined Laid-Open Applications] 1,620,934 and 1,720,527 as an intermediate stage in the production of foam stabilizers or laminating resins. These DOS's do not contain any teaching of using the reaction products in connection with elastomer-filler mixtures. Also, as above, both cases involve products having a high vinyl content, whereas the remaining double bonds consist predominantly of trans-vinylene groups. Polybutadienes of this microstructure possess a very high viscosity at room temperature, even at relatively low molecular weights; their handling, metering, and blending are made extraordinarily difficult by this consistency. The same limitations are encountered in the hydrosilylated derivatives thereof.

The conventional platinum catalysis of hydrosilylation is also described in U.S. Pat. No. 3,759,869, wherein polymers are claimed having molecular weights of between 500 and 50,000 and containing, to an extent of at least 25% by weight, the structure

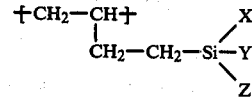

This corresponds, in the case of a pure polybutadiene as the basic polymer, to an attachment of a reactive silyl group -$SiX_3$ to approximately each tenth monomer unit. The examples reveal only the hydrosilylation of a polybutadiene having an average molecular weight of 1,000 and a vinyl group content of 90%, based on the total number of double bonds, namely with practically 100% saturation of all vinyl groups present. Mixtures of such products, or the derivatives thereof obtained by secondary reactions with low-molecular wieght polypropylene (molecular weight 5,000) and/or with EPM elastomer, are merely mentioned, without any disclosure regarding their effectiveness. Additionally, such most extensively saturated polybutadiene derivatives and/or fillers treated therewith, solely on account of their lack of double bonds, are only poorly suited for forming a composite with a polymer network produced by sulfur or peroxide vulcanization.

DOS, No. 2,343,108 claims the hydrosilylation of elastomer polymers containing at least preferably 5-30% by weight of vinyl groups, and their use as coupling agents for the vulcanization of a vulcanizable elastomer containing a pigment having silicic acid as an ingredient. These are products which, due to their high molecular weight, can only be used in solution.

In contrast thereto, DAS [German Published Application] 2,635,601 describes hydrosilylation products of special polybutadiene oils having molecular weights of 400-6,000, which, thanks to their microstructure (10-60% vinyl groups, 1-15% transvinylene groups, and 25-85% cis-vinylene groups), exhibit particularly low viscosities and therefore can be handled very well in the undiluted form. However, the hydrosilylation products have the disadvantage that the platinum catalyst utilized during their manufacture remains extensively within the product and thus is lost.

Also, the reaction of lithium-terminated "living polymers" with an excess of a tetrahalogeno- or tetraalkoxysilane is known according to the process of U.S. Pat. No. 3,244,664. This excess amount, which must be used to avoid coupling or crosslinking reactions, cannot be practically separated at all and thus is lost to further processing.

Several disclosures are known on the addition of sulfhydryl groups of a mercaptosilane, e.g. of γ-mercaptopropyltriethoxylsilane, to double bonds of an unsaturated polymer (U.S. Pat. No. 3,440,302; DOS Nos. 2,333,566 and 2,333,567), but these processes have the disadvantage of a very expensive and foul-smelling starting material.

Furthermore, processes are known producing polymers with reactive silyl groups using silyl-group-containing peroxy compounds (DOS Nos. 2,152,275 and 2,152,286) or azo compounds (J. Appl. Pol. Sci. 18: 3259 [1974]) as the initiators, or using silyl-group-containing disulfides (DOS No. 2,142,596) as chain-transfer agents in radical polymerizations. Here again, the auxiliary agents utilized for introduction of the silyl groups are hard to obtain, very expensive, and in most cases not at all available commercially. In addition, maximally two reactive silyl groups can be introduced in this way, namely, at the ends of the polymer chain. Products having a higher silicon content, which can be desirable for attaining special effects, e.g., increased spontaneous crosslinking, cannot be produced in this way.

Polyalkenamers which contain silyl groups can be readily prepared by using silyl olefins (German Pat. No. 2,157,405) or silyl cycloolefins (DAS 2,314,543) as the regulators, or as the (co-) monomers during the ring-opening polymerization of cycloolefins; however, here again, general usage is restricted by the lack of commercial availability of the reactants.

SUMMARY OF THE INVENTION

It is, therefore, an object of the present invention to provide products (and a process for preparing them) which can be prepared using readily accessible and inexpensive starting materials without loss of valuable noble metals, and using simplified processing conditions, and which have a content of reactive silyl groups which can be varied within wide limits.

Upon further study of the specification and appended claims, further objects and advantages of this invention will become apparent to those skilled in the art.

These objects have been attained by this invention by providing homo- or copolymers of 1,3-dienes carrying reactive silyl groups, containing 0.4-12% by weight of bound silicon, and obtained by reacting a 1,3-diene homo- or copolymer, containing conjugated double bonds and having a molecular weight ($\overline{M}n$) of 400-6,000, with a silicon compound of Formula I

wherein

R is an unsaturated aliphatic hydrocarbon residue of 2-20 carbon atoms,

X is a hydrolyzable group,

Y and Z independently are each X, hydrogen, alkyl of 1-8 carbon atoms, cycloalkyl of 5-12 carbon atoms, or optionally substituted phenyl, at a temperature of 190°-300° C., optionally in the presence of stabilizers suppressing the radical polymerization of the unsaturated silanes, such as, for example, tert-butyl pyrocatechol or hydroquinone (e.g., in amounts of 0.01-0.5% based on the weight of the polymer).

DETAILED DISCUSSION

Starting compounds for the silyl-group-carrying polymeric compounds of this invention are, consequently, on the one hand, 1,3-diene homo- or copolymers containing conjugated double bonds and having molecular weights ($\overline{M}n$) of 400-6,000 (as measured by gel-permeation-chromatography), and, on the other hand, the unsaturated silicon compounds of Formula I.

Homo- and copolymers of 1,3-dienes (e.g., of 1,3-dienes of 4-6 C atoms) are understood to mean, within the scope of this invention: homopolymers of, for example, 1,3-butadiene, isoprene, 2,3-dimethylbutadiene, piperylene, etc.; copolymers of these 1,3-dienes with one another; copolymers of these 1,3-dienes with vinyl-substituted aromatic compounds, such as, for example, styrene, α-methylstyrene, vinyltoluene, divinylbenzene etc.; as well as reaction products of conjugated 1,3-dienes and aromatic hydrocarbons according to the method of Japanese Laid-Open Application 49-32985 and German Patent Applications P 28 48 804.2 and P 30 00 708.0 (all of whose disclosures are incorporated by reference herein), insofar as their aliphatic double bonds can be isomerized into conjugated -ene structures. The content of vinyl-substituted aromatic compounds in the copolymers is not to exceed 50 molar percent. Preferably, polybutadienes are used having molecular weights ($\overline{M}n$) of 600-2,000. The microstructure of the dienes in the homo- and copolymers and/or in the aforementioned reaction products is generally not critical, but it is advantageous for at least 20% of the double bonds to be of the cis-1,4-structure. In general, homo- or copolymers are utilized having the following distribution of double bonds:

0-60% vinyl groups,
1-25% trans-vinylene groups,
25-85% cis-vinylene groups.

Such products can be produced according to many known processes of the prior art (such as, for example, German Pat. No. 1,186,631; DAS No. 1,212,302; German Pat. No. 1,292,853; DOS No. 2,361,782; and DOS No. 2,342,885, all of whose disclosures are incorporated by reference herein).

Since the content of conjugated double bonds in these products is generally very low (<1%), no matter which process and which catalyst is used for their preparation, they must be treated with a so-called isomerization catalyst before their reaction with the unsaturated silicon compounds of Formula I. This can be accomplished conventionally or, for example, according to one of the processes, not yet part of the prior art, of German Patent Applications P 29 24 548.5; P 29 24 577.0; P 29 24 598.5; and P 30 03 894.9, all corresponding to U.S. Pat. Application Ser. No. 160,807 filed on June 19, 1980, all of whose disclosures are incorporated by reference herein. According to these processes, low-molecular weight 1,3-diene homo- or copolymers, except for the reaction products of conjugated 1,3-dienes and aromatic hydrocarbons, are treated with a special isomerization catalyst, optionally in the presence of a solvent, at temperatures of 0°-250° C. The above-excepted reaction products can be isomerized, for example, using a catalyst which is either an alkali alcoholate, optionally additionally containing a compound from the group consisting of dimethyl sulfoxide, dimethylformamide and N-methylpyrrolidone, or which is a reaction product and/or mixture of an alkali metal and/or an alkali metal hydride and/or an alkali metal compound and/or an organomagnesium compound, with ammonia and/or an amine and/or hexamethylphosphoric triamide.

In the reaction products, up to 100% of the double bonds can be isomerized into conjugated form with the aforementioned catalyst systems. Using these systems, the proportion of conjugated double bonds in the 1,3-diene homo- and copolymers, based on the sum total of aliphatic double bonds present, should be set for this invention at 1–70%, preferably 2–50%, and especially preferably 5–35%.

The conjugated -ene contents, determined by UV spectroscopy, are composed essentially of conjugated diene structures (absorption band at about 230 nm), and, in addition, to a minor extent of conjugated triene structures (absorption band at about 270 nm) and tetraene structures (absorption band at about 320 nm). For the polybutadienes, these are indicated as percent by weight, calculated for $C_8H_{14}$ (conjugated dienes), $C_8H_{12}$ (conjugated trienes) and $C_8H_{10}$ (conjugated tetraenes).

According to this invention, the reactive silyl groups are introduced into the 1,3-diene homo- or copolymer by reaction with a silicon compound of Formula I. In the

R is an unsaturated, aliphatic, hydrocarbon residue of 2–20, preferably 2–6 carbon atoms; X is a hydrolyzable residue, i.e., hydrolyzable in the presence of water and preferably a polycondensation catalyst, e.g., halogen, preferably chlorine and bromine; alkoxy or alkoxyalkoxy, preferably of up to 6 carbon atoms; aryloxy, preferably 6–12 carbon atoms; carboxylate, based on a hydrocarbon preferably of up to 8 carbon atoms; ketoximate, based on a hydrocarbon preferably of up to 6 carbon atoms; amido, based on a hydrocarbon of preferably up to 12 carbon atoms; and equivalents thereof. Y and Z can be the same as X, but can also be hydrogen, alkyl of 1–8 carbon atoms, cycloalkyl of 5–12 carbon atoms, phenyl or an equivalent substituted phenyl, e.g., phenyl substituted by halogen and/or alkyl groups.

Typical representatives of the unsaturated organosilanes include, for example, vinyltrichlorosilane, vinyltrimethoxysilane, vinyltriethoxysilane, vinyltris(methoxyethoxy)silane, vinylmethyldimethoxysilane, vinyldimethylchlorosilane, allylmethylbutylchlorosilane, allylethyldibromosilane, allyldimethylacetoxysilane, allyltriisopropoxysilane, allylphenyldiphenoxysilane, methallylbutylchlorobromosilane, crotylmethylpropyliodosilane, ω-undecenylfluorochlorobromosilane, octadecen-(9)-yltriacetoxysilane, and vinyldimethylketoximatomethoxychlorosilane.

Preferred are vinyl- and allylsilanes with halogen atoms or alkoxy groups as the residues X which can be removed by hydrolysis, for example vinyltrichlorosilane, vinylmethyldichlorosilane, vinylmethylethylchlorosilane, vinyltrimethoxysilane, vinyltriethoxysilane, vinylmethyldibutoxysilane, allyltribromosilane, and allylethylmethoxypropoxysilane.

Among the unsaturated halosilanes, those with chlorine as the halogen are, in turn, also preferred, so that, for example, vinyltrichlorosilane, vinylmethyldichlorosilane, vinylmethylchlorosilane, and allyltrichlorosilane are especially preferred. Conversion of the chlorosilyl groups introduced with such compounds into other reactive silyl groups can optionally take place, for example, during the course of the processing step, e.g., by adding, preferably, alcohols, trialkyl orthoformates, epoxides, sodium acetate, etc. according to conventional prior art reactions.

Such a conversion, however, generally utilized to avoid subsequent HCl release, can be omitted if the liquid hydrosilylation product is advantageously applied directly to a mineral filler and care is taken that the hydrochloric acid liberated during this reaction is removed; this hydrochloric acid is obtained in this case as dry gaseous hydrogen chloride, rather than as a solution in alcohol or alkyl chloride, i.e., it can be passed on to further use.

From the class of compounds of the unsaturated alkoxysilanes, those having alkoxy residues of 1–4 carbon atoms are particularly advantageous, so that preferred representatives in this connection are vinyltrimethoxysilane, vinyltriethoxysilane, vinylmethoxydiethoxysilane, vinylmethylmethoxypropoxysilane, allylpropylpropoxybutoxysilane. Quite especially preferred is the use of vinyltrimethoxysilane, vinyltriethoxysilane, vinylmethyldimethoxysilane, and vinylmethyldiethoxysilane. By using these unsaturated alkoxysilanes, the advantage is obtained that working up of the addition products can practically be omitted or can be restricted to the removal by distillation of any residues of unreacted alkenylalkoxysilane. Such residues, though not adversely affecting the suitability of the products as adhesion promoters, reduce their flash points to a marked extent due to their volatility, whereby one of the advantages of the products of this invention is lessened.

The addition reaction between the 1,3-diene homo- or copolymers and the unsaturated silicon compounds of Formula I is generally conducted by heating the reactants to temperatures of 190°–300° C., preferably 200°–260° C., under an inert gas. The unsaturated silane is generally employed up to a three-fold molar excess, based on the conjugated diene structure of the 1,3-diene homo- or copolymer. The reaction times are generally 1 to 12 hours, preferably 3 to 6 hours, depending on the reaction temperature selected.

Elevated pressure is necessary for the addition reaction only insofar as the vapor pressure of the added, unsaturated silane at the selected reaction temperature is >1 bar. Since, in the production of the low-molecular weight 1,3-diene homo- and copolymers, a slight excess pressure is utilized anyway, and suitably the isomerization as well as the subsequent silane addition are conducted in the same reaction vessel, the expenditure in apparatus generally would not be increased if the addition reaction is conducted under elevated pressure.

The especially low viscosity of 1,3-diene homo- and copolymers used facilitates the conductance of the addition reaction, since the latter can thus be accomplished, in general, without adding an otherwise required solvent, and also makes it easier to work up and handle the addition products. The mode of operation used in this process thereby does not only become more economical, but also more advantageous from an ecological viewpoint, since it is neither necessary to consume solvents nor subsequently to discharge such solvents into wastewaters or into the atmosphere.

The homo- or copolymers of 1,3-dienes carrying reactive silyl groups are worked up, if at all, by withdrawing unreacted silane under vacuum.

The desired content of bound silicon of 0.4–12%, preferably 1–5%, by weight and/or the added quantity of unsaturated silane, and thus the number of reactive silyl groups present on the average in the addition product, can be adjusted by way of the degree of isomerization and the quantity of silane introduced. This content is primarily dependent on the specific intended end use of the addition product. Thus, an increase in the content of reactive silyl groups raises the reactivity of the addition products, and their tendency to form a network of higher crosslinking density by polycondensation of the silanol groups formed after hydrolysis. These properties can be valuable, for example, in a number of applications of the homo- or copolymers of 1,3-dienes carrying reactive silyl groups per this invention, for instance in the field of adhesives, insulating compounds and sealing compounds.

However, the addition compounds of this invention are used primarily as adhesion promoters in the production of mixtures of polymers, preferably elastomers, mineral fillers, and optionally other additives. They can be applied, prior to the production of the mixture, in bulk or in solution, onto the mineral filler, or they can also be added to the mixture during its preparation.

Suitable mineral fillers include, for example, silicic acids ($SiO_2$) and silicates (such as kaolin, talc, asbestos, mica, glass fibers, glass beads, synthetic Ca, Mg, and Al silicates, Portland cement, blast furnace slag), aluminum hydroxide and oxide (hydrate)s, iron (hydr)oxide(s), etc. The content of such fillers is generally 10–70% of the total weight of the resultant compositions, the content of the silylated polymers of this invention generally being 0,1–3%, preferably 0,3–2%, on the same basis.

Suitable elastomers include all customary types vulcanizable by peroxides and/or sulfur, such as, for example, natural rubber, synthetic polyisoprene, polybutadiene, styrene-butadiene copolymers, polyalkenamers (such as polypentenamers, polyoctenamers, or polydodecenamers), ethylene-propylene copolymers (EPM), isobutene-isoprene copolymers (butyl elastomer), butadiene-acrylonitrile copolymers, etc. Their content in these compositions is generally 15–90%, preferably 25–80%, on the same basis.

In addition, even other polymers, such as, for example, polyethylene, polypropylene, polybutene, polyvinyl chloride, ethylene-vinyl acetate copolymers, polystyrene, optionally with the addition of radical-forming agents, such as dicumyl peroxide, can be crosslinked using the polymeric adhesion promoters of this invention and/or can be reinforced with mineral fillers thereby.

Additives which can optionally be combined with the mixtures of polymers, preferably elastomers, mineral fillers, and the adhesion promoter of this invention are understood to mean, above all, vulcanizing agents and plasticizers, generally in amounts of 2–30% on the same basis.

Vulcanizing agents primarily include sulfur in combination with the conventional vulcanization accelerators, with the addition of zinc oxide and higher fatty acids, such as, for example, stearic acid. With the same success, it is also possible to use for crosslinking purposes, peroxides or special sulfur donors, such as, for example, N,N'-morpholine disulfide or special thiurams.

Suitable plasticizers include the conventional refinery products. In this connection, oils having predominantly aromatic, naphthenic, or paraffinic components can be used. Furthermore, it is, of course, possible to add any of the conventional antiaging agents.

The products of this invention are furthermore suitable as additives for improving the properties of adhesives, putties, sealing and caulking compounds; as agents for the dispersion of pigments; for making substrates hydrophobic, such as paper, textiles, wood, cardboard, and construction materials; as well as for floor strengthening.

All parts and percentages throughout this application are weight percentages, unless indicated otherwise.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius.

As a test for the incorporation of the analytically determined silicon into the polybutadiene oil, the crosslinking capacity by water is measured. For this purpose, 2.0 g of the product is dissolved in 40 ml of hexane; 1.0 ml of a 5% solution of dibutyltin dilaurate in hexane is added thereto, and the solution is poured on water in a dish (surface area 600 $cm^2$). After standing for 24 hours at room temperature, a solid polymer film forms; after drying, the proportions of this film insoluble in toluene at room temperature (25° C.) are determined.

I. Preparation of the Products of This Invention

EXAMPLE 1

200 g of a polybutadiene oil ($\overline{M}n$ 1,500; cis-1,4 content =72%, vinyl content <1%), exhibiting, after isomerization, a proportion of 21% conjugated diolefins, was maintained in an autoclave under a nitrogen atmosphere together with 947 mmol ( 180 g) of vinyltriethoxysilane for 4 hours at 250° C. During this time, the mixture was agitated. The amount of silane corresponded to a 2.4-fold excess, based on the content of conjugated diene structures. After a subsequent one-hour vacuum treatment at 130° C., there was obtained an oil functionalized with a Si content of 3.6% to an extent of 90%, i.e., 90% of the conjugated -ene structures were utilized for the addition of silane. The crosslinking test showed an 89% insoluble proportion. The vinylsilane contents determined by gas chromatography were <0.1%, as was also the case in the following examples.

EXAMPLES 2-9 AND COMPARATIVE EXAMPLE A

Respectively, 200 g of the polybutadiene oil serving as the starting compound in Example 1, was functionalized under a nitrogen atmosphere using the conditions listed in the table below. The analytical data of the addition products is likewise shown in Table 1.

TABLE 3

|  | Mixture No. | | |
| --- | --- | --- | --- |
|  | 1 | 2 | 3 |
| Time to crosslinking conversion of | | | |
| 10%, $t_{10}$ (minutes) | 3.8 | 4.0 | 4.0 |
| 90%, $t_{90}$ (minutes) | 19.7 | 10.6 | 11.7 |

The initial vulcanizing time $t_{10}$ is affected to only a minor extent by the polymeric silicon compounds of this invention. The final vulcanizing time $t_{90}$, however, is reduced to almost one-half.

The 4 mm test specimens, vulcanized in a press for 20 minutes at 160° C., are subjected to the following tests:

TABLE 1

| Example or Comparative Example | Conjugated -ene Content (%) | Vinylsilane Type | Vinylsilane Amount (mmol) | Molar Ratio of Vinylsilane to Conjugated -ene Content | Reaction Temp. (°C.) | Reaction Time (h) | Si Content in Polymer (%) | Functionalization (%) |
| --- | --- | --- | --- | --- | --- | --- | --- | --- |
| A | 14.6 | CH—CH—SiCl$_3$ | 315.6 | 0.9 | 150 | 12 | 0.07 | 2 |
| 2 | 14.6 | CH$_2$—CH—SiCl$_3$ | 315.6 | 0.9 | 190 | 12 | 0.44 | 12.5 |
| 3(a) | 21.0 | CH$_2$—CH—SiCl$_3$ | 315.6 | 0.8 | 250 | 3 | 1.45 | 41 |
| 4 | 21.0 | CH$_2$—CH—SiCl$_3$ | 315.6 | 0.8 | 225 | 12 | 1.4 | 40 |
| 5 | 21.0 | CH$_2$—CH—Si(OEt)$_3$ | 315.6 | 0.8 | 250 | 3 | 1.25 | 37 |
| 6 | 21.0 | CH$_2$—CH—Si(OEt)$_3$ | 631.2 | 1.6 | 250 | 4 | 2.05 | 51 |
| 7 | 18.7 | CH$_2$—CH—Si(OEt)$_3$ | 631.2 | 1.8 | 250 | 5 | 3.4 | 93 |
| 8 | 18.7 | CH$_2$—CH—Si(OEt)$_3$ | 473.4 | 1.4 | 250 | 5 | 2.05 | 56 |
| 9(b) | 18.7 | CH$_2$—CH—Si(OEt)$_3$ | 631.2 | 1.8 | 250 | 6 | 3.7 | 100 |

(a)The viscosity of the addition product was 1,760 mPa s, that of the starting oil was 1,230 mPa s. Crosslinking test: 77% insoluble proportions.
(b)The viscosity of the addition product was 1,570 mPa s, that of the starting oil was 1,250 mPa s. Crosslinking test: 91% insoluble proportions.

II. Use of the Products of This Invention as Adhesion Promoters

EXAMPLE 10

On a rolling mill, the following mixtures are produced. They are based on unsaturated ethylene-propylene elastomer (EPDM) with ethylidene norbornene as the ternary component:

TABLE 2

|  | Mixture No. | | |
| --- | --- | --- | --- |
|  | 1 | 2 | 3 |
|  | Parts by Weight | | |
| EPDM, statistical type, ML$_{1+4}$ (100° C.) = 70 | 100.0 | 100.0 | 100.0 |
| Zinc oxide | 5.0 | 5.0 | 5.0 |
| Stearic acid | 2.0 | 2.0 | 2.0 |
| Silica | 120.0 | 120.0 | 120.0 |
| Naphthenic mineral oil plasticizer | 25.0 | 25.0 | 25.0 |
| Product according to Example 1 | — | 2.0 | — |
| Product according to Example 7 | — | — | 2.0 |
| Benzothiazyl 2-cyclohexylsulfenamide | 2.0 | 2.0 | 2.0 |
| Tetramethylthiuram disulfide | 1.0 | 1.0 | 1.0 |
| Sulfur | 1.5 | 1.5 | 1.5 |

The course of the vulcanization of these mixtures is determined by using a Zwick oscillating elastometer at 160° C. and with a deformation amplitude of 1° and 3 oscillations per minute. The following measurements are obtained:

| Test | Standard |
| --- | --- |
| Tensile strength (MPa) | DIN 53 504 |
| Elongation at rupture (%) | DIN 53 504 |
| Modulus (MPa) | DIN 53 504 |
| Permanent elongation (%) | Internal Method (Measurement after 1 Minute) |
| Tear propagation resistance according to Pohle (N/mm) | Internal Method (Ring Test) |
| Hardness (Shore A) | DIN 50 505 |
| Compression set (%) | DN 53 517 |

The test results are compiled in Table 4:

TABLE 4

|  | Vulcanizate No. | | |
| --- | --- | --- | --- |
|  | 1 | 2 | 3 |
| Tensile strength | 3.8 | 6.2 | 6.5 |
| Elongation at rupture | 426 | 378 | 365 |
| Modulus at 300% elongation | 2.6 | 5.5 | 5.2 |
| Permanent elongation | 25 | 16 | 15 |
| Tear propagation resistance | 8 | 12 | 12 |
| Hardness | 63 | 67 | 66 |
| Compression set 22 h at 70° C. | 27 | 12 | 11 |

The polymeric silicon compounds of this invention effect in sulfur-vulcanized EPDM mixtures a pronounced increase in crosslinking density, manifesting itself above all by the strong rise in modulus of elasticity and in a reduction of the permanent elongation, as well as compression set. Besides, the tensile strength and the tear propagation resistance are markedly increased.

EXAMPLE 11

In an internal mixer, the following mixtures are prepared on the basis of styrene-butadiene elastomer (SBR):

TABLE 5

| | Mixture No. | |
|---|---|---|
| | 4 | 5 |
| | Parts by Weight | |
| SBR 1502 | 100.0 | 100.0 |
| Zinc oxide | 4.0 | 4.0 |
| Stearic acid | 2.0 | 2.0 |
| Highly disperse, precipitated silicic acid | 50.0 | 50.0 |
| Naphthenic mineral oil plasticizer | 5.0 | 5.0 |
| Polywax of molecular weight 4,000 | 2.0 | 2.0 |
| Product of Example 4 | — | 2.0 |
| Benzothiazyl 2-cyclohexyl-sulfenamide | 1.5 | 1.5 |
| Tetramethylthiuram disulfide | 0.5 | 0.5 |
| Sulfur | 2.0 | 2.0 |

Test specimens of 4 mm, vulcanized in a press at 150° C. for 20 minutes, are examined according to Example 10. Table 6 compares the test results:

TABLE 6

| | Vulcanizate No. | |
|---|---|---|
| | 4 | 5 |
| Tensile strength | 7.6 | 9.0 |
| Elongation at rupture | 519 | 442 |
| Modulus at 300% elongation | 2.7 | 4.8 |
| Permanent elongation | 14 | 8 |
| Tear propagation resistance | 19 | 22 |
| Hardness | 62 | 65 |

Using the adhesion promoter of this invention, cross-linking density is markedly increased as compared with the comparison experiment without the product of this invention. The mechanical properties of the vulcanizates are improved.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A homo- or copolymer of a 1,3-diene bound to reactive silyl groups, whereby it contains 0.4–12% by weight of bound silicon,
   prepared by reacting, at a temperature of 190–300° C., a 1,3-diene homo- or copolymer, with more than 1% of its aliphatic double bonds in conjugation and having a molecular weight ($\overline{M}n$) of 400–6,000, with a silane of the formula

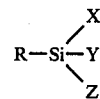

wherein
R is an unsaturated aliphatic hydrocarbon radical of 2–20 carbon atoms,
X is halogen, $C_{1-6}$ alkoxy, $C_{1-6}$ alkoxyalkoxy, $C_{6-12}$ aryloxy, $C_{1-8}$ alkanoyloxy, $C_{1-6}$ ketoximato, $C_{1-12}$ hydrocarbylamido,
Y and Z are independently one of the X groups, hydrogen, alkyl of 1–8 carbon atoms, cycloalkyl of 5–12 carbon atoms, or optionally substituted phenyl.

2. A polymer of claim 1, wherein in the preparative reaction, the temperature is 200°–260° C.

3. A polymer of claim 1 wherein, the starting diene polymer is a polybutadiene of a molecular weight ($\overline{M}n$) of 600–2000.

4. A polymer of claim 1 or 3, wherein the starting diene polymer has a conjugated double bond content of 1–70% and was pretreated by isomerization of its double bond content.

5. A polymer of claim 1, wherein X is halo or $C_{1-4}$ alkoxy.

6. A process for preparing a homo- or copolymer of a 1,3-diene carrying reactive silyl groups of claim 1 consisting essentially of reacting at a temperature of 190°–300° C., a 1,3-diene homo- or copolymer having a molecular weight ($\overline{M}n$) of 400–6,000 and containing more than 1% of its aliphatic double bond in conjugation, with a silane of the formula

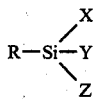

wherein
R, X, Y and Z are defined as in claim 1.

7. A process of claim 6, wherein the reaction is conducted at a temperature of 200°–260° C.

8. A process of claim 6, wherein the reaction is conducted in the presence of a stabilizer which suppresses the radical polymerization of the unsaturated silane.

9. A composition comprising a polymer, a mineral filler and an effective amount of an adhesion promoter, wherein the adhesion promoter is a silyl-containing polymer of claim 1.

10. A composition of claim 9, wherein the polymer is a natural or synthetic elastomer.

* * * * *